United States Patent Office 2,921,779
Patented Jan. 19, 1960

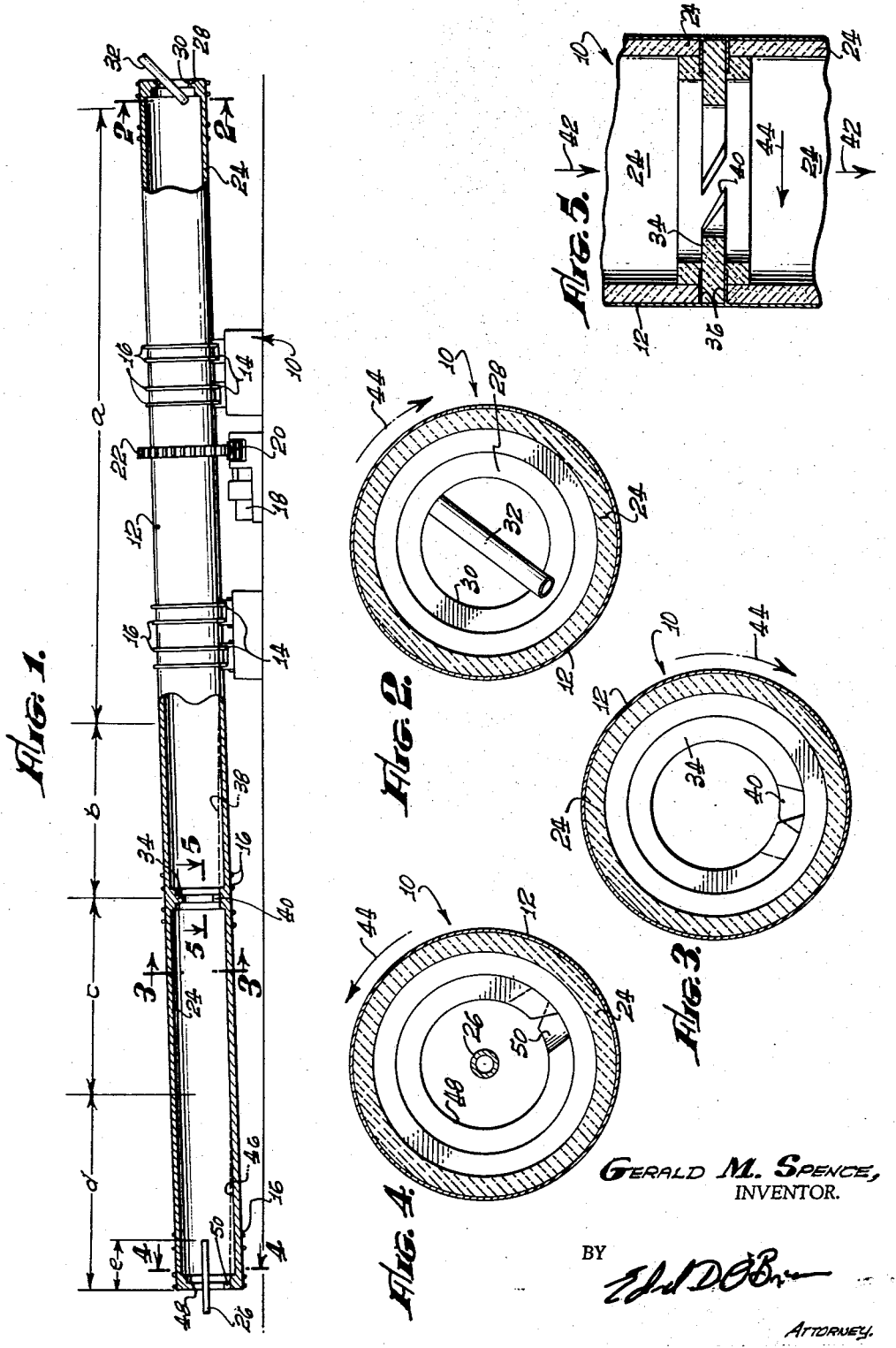

2,921,779

ROTARY KILNS

Gerald M. Spence, Laramie, Wyo., assignor to Monolith Portland Midwest Company, Los Angeles, Calif., a corporation of Nevada Application October 14, 1957, Serial No. 690,043

4 Claims. (Cl. 263—32)

This invention relates to new and improved rotary kilns.

Rotary kilns are commonly used in a large number of industries in order to heat various types of materials. Frequently such kilns are used merely for drying but they are more often used to heat materials in order to promote various types of chemical reactions. A conventional rotary kiln consists of an elongated cylindrical shell mounted at an angle to the horizontal. As such a shell is rotated, the material being heated within it is moved in the direction of the slope of the kiln by virtue of the kiln shell rotation. Various types of means may be installed in these conventional kilns for either heating the interior of the kiln by radiation or by causing hot gas to flow through the kiln. Rotary kilns of the broad type indicated here are considered to be efficient for many types of operations and they are widely employed.

In the cement and in other industries rotary kilns utilizing an elongated cylindrical shell of uniform diameter are considered by some authorities to be less efficient than other types of rotary kilns. Such other kilns are frequently provided with kiln shells which are of a non-uniform diameter. Thus, such shells frequently will include a cylindrical section of one diameter joined to a cylindrical section of either a smaller or larger diameter. Also, in order to increase the efficiency of rotary kilns for certain operations, rotary kilns have been used in conjunction with a number of different types of auxiliary equipment. Frequently such auxiliary equipment is constructed so as to provide preheating of the material to be treated within a rotary kiln.

The fact that none of these various types of constructions is completely satisfactory for all purposes is considered to be amply evidenced by the continued work in developing new and improved rotary kilns. Also, this fact is considered to be evidenced by the comparatively low heat efficiency encountered in rotary kiln operation in many industries such as, for example, the cement industry. In a patent specification it is impossible to specifically enumerate all of the difficulties and problems encountered in rotary kiln operation which have resulted in development and experimental work in this field.

However, in order to explain the invention reference may be made to the operation of a rotary kiln in processes in which a sinter containing sodium aluminate is formed from a mixture of alumina chemically combined with silica, lime and soda. In past efforts to form a sinter from these raw materials in a single conventional rotary kiln a number of difficulties have been encountered in the kiln operation. The tendency of such a mixture to form large rings or nodules within various zones of a rotary kiln has proved troublesome. In using a rotary kiln in this type of process considerable difficulty has been encountered in producing a uniform sinter.

An object of the present invention is to provide rotary kilns which are specifically adapted to be used in producing a sinter containing soluble sodium aluminate from a mixture of the type indicated in the preceding paragraph. Another object of the present invention is to provide rotary kilns which can be satisfactorily employed in carrying out the sintering process described in the co-pending application, Serial No. 688,404, filed October 7, 1957, in a single piece of equipment. In this co-pending application a process is defined by which a satisfactory sinter can be formed from raw material mixture of the type indicated in the preceding paragraph by heating the mixture in a series of essentially independent steps so as to carefully control the reaction conditions present at various stages during the formation of this sinter.

It is not to be assumed from the above that the invention is limited in any respect to rotary kilns which may be employed only in forming a sinter containing soluble sodium aluminate. A broad object of the invention is to provide a new type of rotary kiln construction which may be satisfactorily employed in the treatment of any raw material mixture where such treatment involves a series of controlled heating steps. A more specific object of the invention is to provide rotary kilns in which means are provided for holding the material within a rotary kiln at a relatively constant temperature at various stages as the material is agitated and passes through such a kiln.

Because of the nature of this invention it is not considered necessary to set forth in this description a further long list of objects and advantages of the invention itself. Those skilled in the art to which this invention pertains will realize further objects and advantages of the invention from a consideration of the remainder of this specification, including the appended claims and the accompanying drawing in which:

Fig. 1 is a side elevational view, partially in section, of a presently preferred embodiment of a rotary kiln of this invention;

Fig. 2 is a cross-sectional view taken at line 2—2 of Fig. 1;

Fig. 3 is a cross-sectional view taken at line 3—3 of Fig. 1;

Fig. 4 is a cross-sectional view taken at line 4—4 of Fig. 1; and

Fig. 5 is a partial cross-sectional view taken at line 5—5 of Fig. 1.

In all figures of the drawing, like numerals are used to designate like parts wherever convenient for purposes of illustration and explanation. It is to be understood that this invention is not to be considered as being limited by the accompanying drawing. Obviously a large number of differently appearing rotary kilns may be manufactured which utilize the essential features or principles of this invention.

As an aid to understanding the invention itself, it may be stated that it concerns rotary kilns, each of which is formed so as to include an elongated kiln shell mounted at an angle to the horizontal in such a manner that this kiln shell may be rotated. In accordance with conventional practice means are provided for heating the interior of the kiln shell and means are provided for introducing material into the upper end of the kiln shell. With the present invention what may be considered "dam means" are provided with the rotary kiln shell as desired for any specific application. These dam means serve to retain material with the kiln shell so as to form "soaking" zones or areas in which material is held at a relatively constant temperature while being agitated as the kiln shell rotates.

In order to explain the invention more fully it is considered necessary to refer to the accompanying drawing where there is shown a rotary kiln 10 of the present invention which is specifically designed so as to be used in carrying out the process described in the aforenoted co-pending application Serial No. 688,404, filed October 7, 1957. This rotary kiln 10 includes a cylindrical metal shell 12 having a uniform diameter throughout its length. This shell 12 is rotatably mounted at an angle to the horizontal in a known manner on wheels 14 which engage rails 16 extending completely around the exterior of the shell 12 at a number of points throughout its length. The shell 12 is adapted to be rotated by means of a motor 18 serving to drive a pinion gear 20 which, in turn, engages a ring gear 22 extending completely around the shell 12. Various other equivalent drive means can of course be employed with the kiln 10.

Within the interior of the shell 12 there is located a refractory lining 24 formed out of a heat resistant material. Linings such as the lining 24 are well known at the present time and may be formed out of a variety of different types of refractory bricks. If desired, this lining 24 may be reinforced with metal shims as described in the co-pending Anderson application, Serial No. 630,618, filed December 26, 1956, now Patent No. 2,895,725. It is also believed possible to form a satisfactory lining out of a so-called "cermet" material consisting of a metal-oxide composition by applying such material directly to the shell 12. The purpose of the lining 24 is to protect the shell 12 from the heat developed within this shell during the operation of the kiln 10.

Such heat is created in the embodiment of the invention shown through the operation of a burner 26 which extends into a lower end of the shell 12 a distance $e$ indicated in Fig. 1 of the drawings. In use a combustible mixture is passed through the burner 26 and is burned within the shell 12 so as to create a flame and a hot gas stream which flows from the lower end of the shell out through the upper end of the shell.

Preferably with the invention in the upper end of the shell 12 the lining 24 is extended as indicated in Figs. 1 and 2 of the drawings so as to form a ring 28 located completely around the interior of this shell. The ring 28 provides what may be considered a restricted orifice 30 serving to divert this flow of gas away from the shell immediately adjacent to this ring. This creates a quiescent zone or area into which material may be introduced into the bottom of the shell 12 through a feed pipe 32 without causing undue dust loss.

As the shell 12 is rotated through the operation of the motor 12 such material travels down the length of this shell in accordance with conventional practice the distance $a$ indicated in Fig. 1. During this time this material is gradually heated and is continuously agitated through the operation of the kiln 10. After this material has moved the length or distance $a$ this material comes into what may be considered a "soaking" zone or area $b$ as shown in Fig. 1. This soaking zone or area is located immediately in back of a ring 34 shown in Figs. 1, 3 and 5 of the drawing. This ring 34 is also formed so as to be, in effect, an extension of the lining 24. If desired, it may be reinforced with metal plates 36 as indicated in Fig. 5; although it is not necessary with the invention, the ring 34 may be formed in a stepwise manner as indicated in Figs. 1 and 5 for structural reasons.

As material is moved into the soaking zone or area $b$ in Fig. 1 the ring 34 holds this material so as to form a relatively thick bed 38 of material as indicated in dotted lines in Fig. 1. Here this material is held at a relatively constant temperature while being agitated; it is gradually dispensed from this bed 38 past the ring 34 through the rotation of the shell 12. Although this ring 34 may be made of a continuous nature so as to be substantially identical in internal configuration with the ring 28 it is preferable to provide within this ring 34 a comparatively small groove 40 which cuts through it at an angle to the axis of the kiln shell 12.

As can be seen from the arrows 42 in Fig. 5 indicating the direction of material movement through the shell 12 and the other arrows 44 in Figs. 2 and 5 of the drawing showing the direction of rotation of the shell, it will be realized that this groove 40 extends at a diagonal through the ring 34 so as to cut into the bed 38 of material as the shell 12 is rotated, so as to act as a dispensing opening or orifice through the ring 34 each time the shell 12 is rotated. Thus, the groove 40 provides a convenient means for dispensing a relatively uniform quantity of material from this bed 38 each time the kiln rotates.

As material passes the ring 34 it moves through the interior of the shell the distance $c$ indicated in Fig. 1 of the drawing. During such movement of material it is agitated and heated as in movement through the distance $a$. Next this material moves into another bed 46 extending the distance $d$ indicated in Fig. 1 of the drawing. This bed is created by means of a ring 48 located on the lower or discharge end of the shell 12 as indicated in Fig. 4 of the drawings. The ring 48 is formed so as to be substantially identical to the ring 34; it includes a groove 50 formed therein serving the same function as groove 40 previously described.

The ring 34 serves to restrict the flow of gas within the kiln away from the lining 24 so as to create a quiescent zone on both sides of this ring. The groove 40 not only serves to dispense material past this ring, but also serves to convey material past this ring in such a manner that this material is not contacted by the restricted gas flow through the ring. Thus, the groove 40 aids in preventing dust losses. The groove 50 in the ring 48 serves substantially the same function in dispensing material from the kiln. In this case, however, the ring 48 merely serves to constrict the flow of air drawn into the kiln through the operation of the burner 26.

The operation of the complete kiln is comparatively simple. In using this kiln to continuously carry out the process described in the co-pending application, Serial No. 688,404, filed October 7, 1957, a dried mixture containing a composition in which alumina is chemically combined with silica, lime and soda is introduced into the shell 12 through the feed pipe 32. As the shell 12 is rotated this material is preheated through the operation of the burner 26 so that by the time material moves into the bed 38 extending the distance $b$ indicated in Fig. 1 it has reached a temperature of about 1564° F. Within this bed the material is held for a sufficient period of time so as to react the sodium present in order to form intermediate compounds; within this bed this material is agitated and held at a relatively constant temperature of from about 1564° F. to 1900° F. until such reactions are substantially complete.

After the mixture is moved through the bed 38 it is again heated and agitated while passing through the portion of the kiln shell 12 extending the distance $c$. By the time this material reaches the bed 46 it is at a temperature of about 2200° C. Within this bed it is agitated and held within the temperature range of from about 2200° to 2500° F. for a sufficient period to produce a uniform product containing soluble sodium aluminate and dicalcium silicate. The heat required for these operations is, of course, produced by the burner 26.

The location of the rings 34 and 48 constituting "dam" means within the shell 12 is determined with reference to the temperatures prevailing within the kiln shell, the speed of rotation of this rotary shell, the dimension of this kiln 10, and the quantity of material which is to be treated within the kiln shell. In general it may be stated that the rings employed so as to create "soaking" zones or areas such as the beds 38 and 46 should be placed within the shell 12 where the temperatures desired for "soaking" material prevail.

Those skilled in the art to which this invention pertains will realize that the number of rings or "dam" means employed in any kiln shell may be varied in order to adapt this invention for use with any specific process. Obviously the placement of such rings will also have to be varied in utilizing the features of the invention with other processes than the specific process herein indicated. The use of means for retaining material such as these rings is advantageous in any process in which it is desired to use a rotary kiln to heat material and then to hold or soak this material in a bed within a relatively constant temperature range for a specific period. Because of the fact that this invention may be used with a number of different processes it is to be considered as being limited only by the appended claims forming a part of this specification.

I claim:

1. A rotary kiln which includes: an elongated, cylindrical, metal kiln shell; means rotatably supporting said kiln shell at an angle to the horizontal so that said kiln shell has upper and lower ends; a ring located within said kiln shell so as to extend around the interior of said kiln shell, said ring including groove means formed therein extending diagonally through said ring at an angle to the axis of said kiln shell, said groove means also extending toward said kiln shell from the interior of said ring, said ring serving to hold material within said kiln shell on the side thereof adjacent to the upper end of said kiln shell during the operation of said rotary kiln so as to form a soaking bed within said kiln shell, said groove means serving to dispense material from said soaking bed during the rotation of said kiln shell.

2. A rotary kiln which includes: an elongated, cylindrical metal kiln shell having a uniform diameter throughout its length; means rotatably supporting said kiln shell at an angle to the horizontal so that said kiln shell has upper and lower ends; a refractory lining located within said kiln shell; a ring formed of refractory material located within said kiln shell intermediate to the ends thereof so as to extend around the interior of said lining, said ring including a groove formed therein extending diagonally through said ring at an angle to the axis of said kiln shell, said groove also extending toward said kiln shell from the interior of said ring, said ring serving to hold material within said kiln shell on the side thereof adjacent to the upper end of said kiln shell during the operation of said rotary kiln so as to form a soaking bed within said kiln shell, said groove serving to dispense material from said soaking bed during the rotation of said kiln shell.

3. A rotary kiln which includes: an elongated, cylindrical metal kiln shell; means rotatably supporting said kiln shell at an angle to the horizontal so that said kiln shell has upper and lower ends; a refractory lining located within said kiln shell; a ring formed of a refractory material located at the lower end of said kiln shell so as to extend toward the interior of said kiln shell from said lower end, said ring including a groove formed therein extending diagonally through said ring at an angle to the axis of said kiln shell, said groove also extending toward said kiln shell from the interior of said ring, said ring serving to hold material within said kiln shell on the side thereof adjacent to the upper end of said kiln shell during the operation of said rotary kiln so as to form a soaking bed within said kiln shell, said groove serving to dispense material from said soaking bed during the rotation of said kiln shell.

4. A rotary kiln which includes: an elongated, cylindrical metal kiln shell having an uniform diameter throughout its length; means rotatably supporting said kiln shell at an angle to the horizontal so that said kiln shell has upper and lower ends; burner means extending into the lower end of said kiln shell; feed means extending into the upper end of said kiln shell; refractory lining means located within said kiln shell; ring means formed of a refractory material located within said kiln shell intermediate the ends thereof so as to extend around the interior of said lining, said ring means extending into the interior of said kiln shell on the side thereof adjacent to said upper end of said kiln shell during the operation of said rotary kiln, said ring means including a groove means formed therein so as to extend diagonally through said ring means at an angle to the axis of said kiln shell, said groove means also extending from the interior of said ring means toward said kiln shell serving to dispense material from said soaking bed during the rotation of said kiln shell; and other ring means formed of a refractory material located at the lower end of said kiln shell so as to extend toward the interior of said kiln shell from said lower end, said other ring means serving to form another soaking bed within said kiln shell adjacent to said burner means during the operation of said rotary kiln, said other ring means including groove means formed therein so as to extend diagonally through said other ring means at an angle to the axis of said kiln shell, said other groove means also extending from the interior of said other ring means toward said kiln shell, serving to dispense material from said other soaking bed during the rotation of said kiln shell.

References Cited in the file of this patent

UNITED STATES PATENTS

| 2,119,528 | Debuch et al. | June 7, 1938 |
| 2,173,182 | Ronne | Sept. 19, 1939 |
| 2,229,383 | Lohse | Jan. 21, 1941 |
| 2,387,014 | Gibson | Oct. 16, 1945 |
| 2,653,809 | Azbe | Sept. 29, 1953 |

FOREIGN PATENTS

| 27,004 | Denmark | Nov. 30, 1920 |

UNITED STATES PATENT OFFICE

CERTIFICATE OF CORRECTION

Patent No. 2,921,779                                        January 19, 1960

Gerald M. Spence

It is hereby certified that error appears in the printed specification of the above numbered patent requiring correction and that the said Letters Patent should read as corrected below.

Column 3, line 46, for "motor 12" read -- motor 18 --; column 4, line 54, for "2200° C." read -- 2200° F. --.

Signed and sealed this 20th day of December 1960.

(SEAL)
Attest:

KARL H. AXLINE                                                  ROBERT C. WATSON
Attesting Officer                                             Commissioner of Patents